United States Patent
Satran et al.

[19]

[11] Patent Number: 5,803,674
[45] Date of Patent: Sep. 8, 1998

[54] EXCHANGEABLE CUTTING INSERT

[75] Inventors: Amir Satran, Kfar Vradim; Rafael Margulis, Karmiel, both of Israel

[73] Assignee: Iscar, Ltd., Migdal Tefen, Israel

[21] Appl. No.: 542,858

[22] Filed: Oct. 13, 1995

[30] Foreign Application Priority Data

Oct. 23, 1994 [IL] Israel ........................................ 111367

[51] Int. Cl.$^6$ .................................................. B23C 5/20
[52] U.S. Cl. .......................... 407/42; 407/113; 407/117; 407/119
[58] Field of Search ................................... 407/113, 114, 407/115, 116, 117, 119, 42, 35

[56] References Cited

U.S. PATENT DOCUMENTS

| | | | |
|---|---|---|---|
| 4,681,487 | 7/1987 | Pettersson | 407/114 |
| 5,052,863 | 10/1991 | Satran et al. . | |
| 5,071,292 | 12/1991 | Satran . | |
| 5,078,550 | 1/1992 | Satran et al. . | |
| 5,082,401 | 1/1992 | Niebauer . | |
| 5,096,338 | 3/1992 | Takahashi | 407/116 X |
| 5,145,295 | 9/1992 | Satran . | |
| 5,193,947 | 3/1993 | Bernadic et al. . | |
| 5,199,827 | 4/1993 | Pantzer et al. | 407/114 X |
| 5,207,538 | 5/1993 | Satran | 407/116 X |
| 5,246,315 | 9/1993 | Hansson | 407/116 X |

FOREIGN PATENT DOCUMENTS 0 587 109 3/1994 European Pat. Off. .

*Primary Examiner*—Daniel W. Howell
*Assistant Examiner*—Henry W.H. Tsai
*Attorney, Agent, or Firm*—Pennie and Edmonds, LLP

[57] ABSTRACT

An exchangeable cutting insert having a substantially prismatic shape is disclosed. The insert has an upper rake surface, an opposite, substantially parallel base surface and side surfaces, adjacent side surfaces intersecting at an insert corner. Each side surface also intersects with the rake surface so as to define a cutting edge. Each cutting edge comprises a major cutting edge portion extending from one insert corner and merging with a succeeding, associated minor cutting edge portion, which terminates in a successive insert corner. Chip diverting ribs respectively associated with each of the cutting edges are formed on the rake surface. Each rib extends from a region adjacent the merger of the major and minor cutting edge portions on its associated cutting edge, and is substantially coextensive with the region of merger and is spaced from this region by a portion of the rake surface.

22 Claims, 7 Drawing Sheets

EXCHANGEABLE CUTTING INSERT

FIELD OF THE INVENTION

This invention relates to an exchangeable cutting insert for use in machining operations such as, for example, milling, drilling, boring, turning, etc. The invention particularly relates to such exchangeable cutting inserts which are indexable, i.e., they possess a plurality of cutting edges which can be successively indexed into position.

BACKGROUND OF THE INVENTION

With such indexable, exchangeable cutting inserts having chip forming means, there arises the danger that during machining with a particular indexed, operational cutting edge, the chip which is being sheared off may contact a subsequent cutting edge or an extension of the indexed operational cutting edge, this undesired contact possibly leading to the wear of the extension which does not participate in the cutting effected by the indexed operational cutting edge or other form of damage thereto.

Thus, for example, with a particular type of cutting insert to which the present invention relates, namely, an exchangeable cutting insert for use in milling such as, of the kind described and forming the subject matter of our co-pending European Patent Application No. 0587109 (hereinafter referred to as "an exchangeable cutting insert" of the kind specified) which is of basic square shape having four alternative indexable cutting edges, each cutting edge being formed continuously with a wiper edge slightly angularly disposed with respect thereto and forming an extension thereof. In use, each cutting edge is operatively associated with a transversely directed wiper edge which is formed as a continuous extension of an adjacent cutting edge.

During use, the chip which has been formed during milling by the operational indexed cutting edge could contact the wiper edge formed as a continuous extension of the operational indexed cutting edge leading to its damage or wear.

Similarly, with other and differing types of inserts the chip formed by an operational indexed cutting edge during, for example, an internal or external turning process could well contact an adjacent corner of the insert not directly involved in the cutting operation thereby possibly impairing its use during a successive operation when this corner has been indexed into a cutting position and thus constituting a not readily detectable cause for defective workpieces.

It is an object of the present invention to provide an exchangeable cutting insert with means whereby the above-referred to dangers are substantially reduced or overcome.

BRIEF SUMMARY OF THE INVENTION

According to the present invention, there is provided an exchangeable, indexable cutting insert of substantially prismatic shape having an upper rake surface, an opposite, substantially parallel base surface and side surfaces with each pair of side surfaces intersecting at an insert corner, each side surface intersecting with said rake surface so as to define a cutting edge, each cutting edge comprising a major cutting edge portion extending from one insert corner and a succeeding minor cutting edge portion terminating in a successive insert corner, and chip diverting ribs respectively associated with said cutting edges and formed on said rake surface, each rib extending from a region adjacent the merging of said major and minor portions of the associated cutting edge so as to be substantially coextensive with said region and so as to be spaced therefrom by a portion of said rake surface.

The angle defined between each rib and its associated major cutting edge portion lies in the range of 40°–110°, a preferred range being 50°–95°.

In accordance with a preferred embodiment of the present invention, the exchangeable, indexable insert is constituted by a milling insert of basic square shape having four alternative cutting edges each cutting edge being formed continuously with a wiper edge of which it forms an extension and which is slightly angularly disposed with respect thereto, each cutting edge constituting said major cutting edge portion whilst the wiper edge which forms a continuous extension thereof, constituting the succeeding minor cutting edge portion.

Clearly, this minor cutting edge portion, can, in the case of other types of inserts in accordance with the invention, be constituted, for example, by a rounded corner of the insert, which is, in this way protected against wear and tear.

Thus, with such a cutting insert in accordance with the invention, the chip formed by the operative indexed cutting edge, i.e. the major cutting edge portion, contacts the associated chip diverting rib and is therefore diverted from the wiper edge (constituting a continuous extension of the operative cutting edge portion) i.e. the minor cutting edge portion, and in this way wear and damage to the wiper edge is avoided.

BRIEF SUMMARY OF THE DRAWINGS

One embodiment of the invention will now be described by way of example and with reference to the accompanying drawings in which.

DETAILED DESCRIPTION OF A PREFERRED EMBODIMENT

Figure 1:
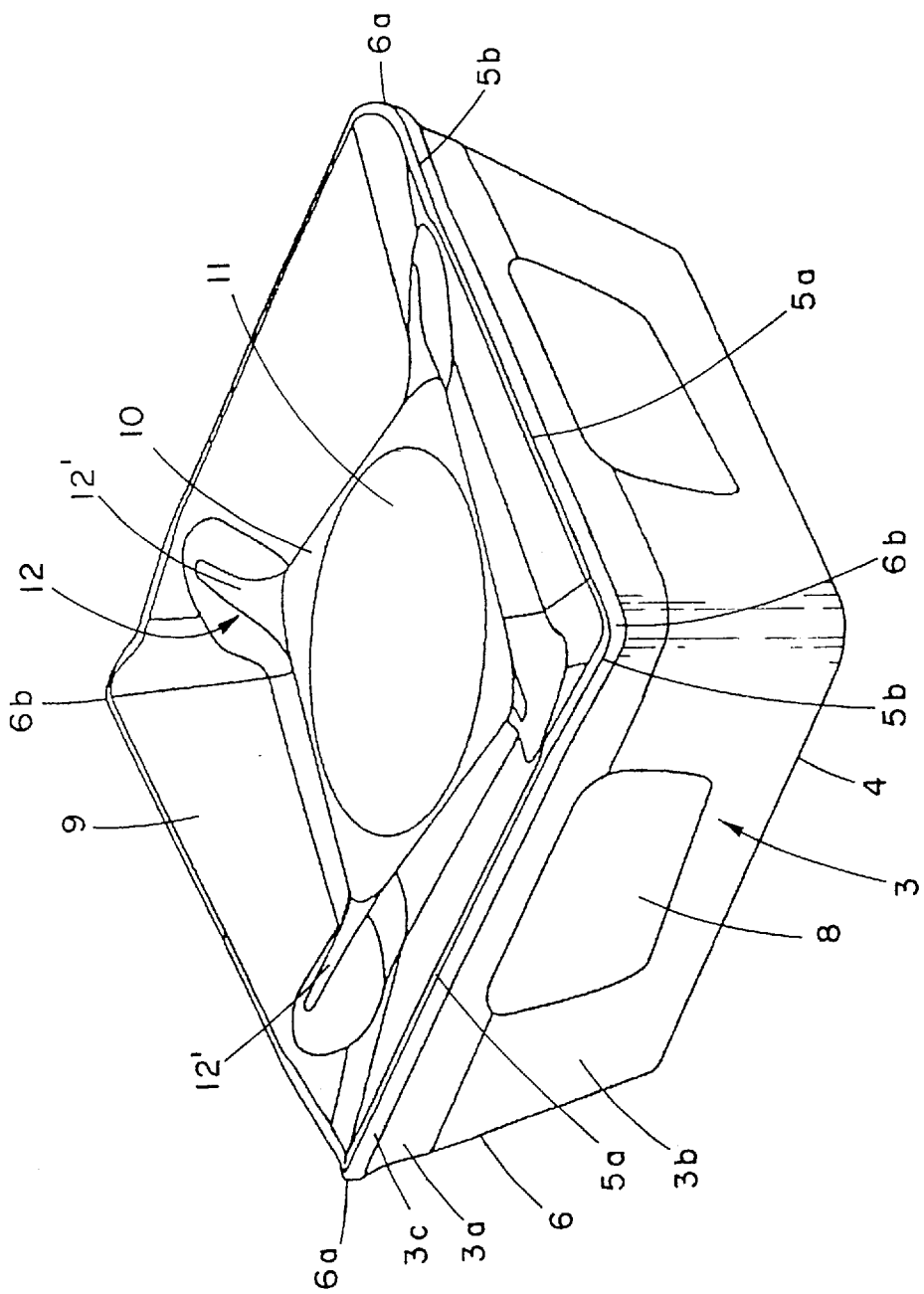
FIG. 1 is a perspective view of an indexable and exchangeable milling insert in accordance with the invention.
Figure 2:
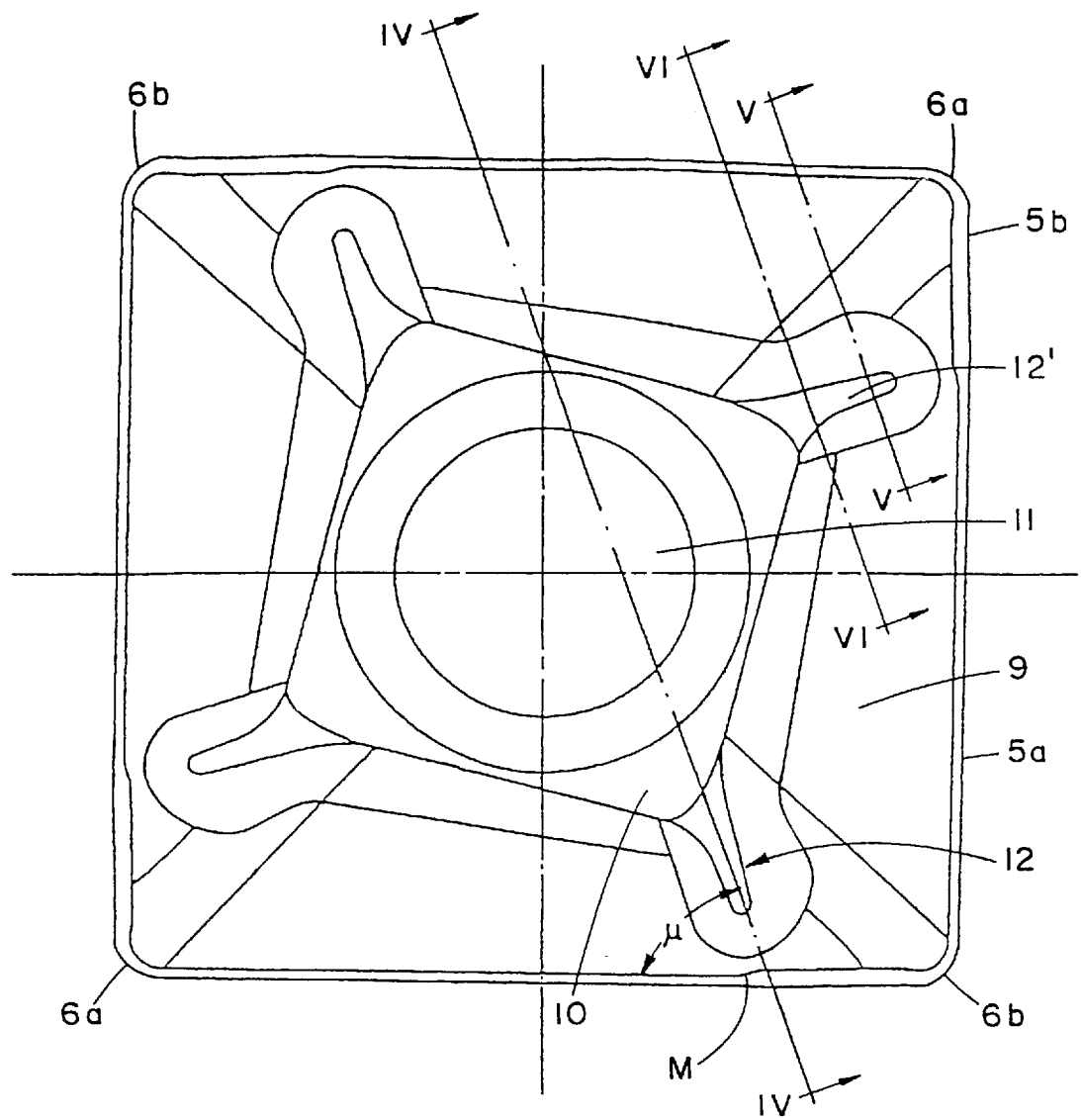
FIG. 2 is a plan view from above of the insert shown in FIG. 1.
Figure 3:
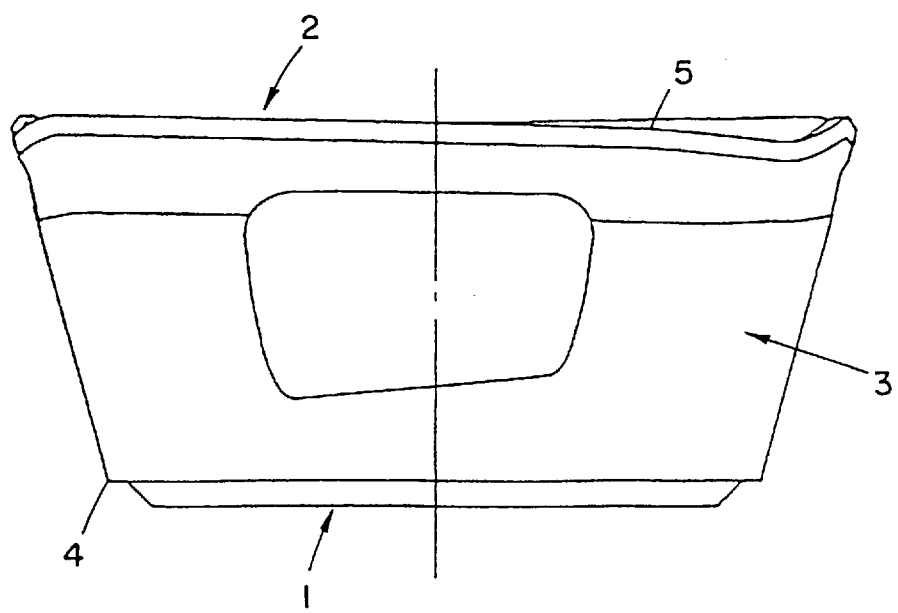
FIG. 3 is a side elevation of the insert shown in FIG. 1.

As seen in FIGS. 1, 2 and 3 of the drawings the milling cutter insert comprises a substantially planar, square base 1 and a substantially square rake surface 2. Four identical side flanks 3 extend outwardly from respective side edges 4 of the base and intersect the rake surface 2 at respective cutting edges 5 of the insert. Each cutting edge 5 comprises a major cutting edge portion 5a and, as a continuous extension thereof, a minor cutting edge portion 5b constituting a wiper edge. As seen with reference to one cutting edge 5, the major cutting edge portion 5a extends from an insert corner 6a whilst the wiper edge 5b terminates in a successive insert corner 6b, it being understood that with the successive cutting edge 5, the major cutting edge portion 5a extends from the insert corner 6b whilst the wiper edge 5 terminates in the successive insert corner 6a.

Each side flank 3 comprises upper and lower side flank portions 3a and 3b the upper portion 3a terminating in a protruding collar portion 3c together forming a relief flank surface whilst the lower portion 3b constitutes an insert locating portion. The insert locating portion 3b is formed with a central recessed section 8.

The upper rake surface 2 is constituted adjacent each cutting edge 5 by a component rake surface 9 which extends downwardly from the cutting edge 5 in the direction of the base 1 towards a central planar portion 10 of the upper rake surface 2 which is parallel with the base 1. Formed in the central planar portion 10 and extending through the insert is a through-going bore 11 by means of which the insert can be clamped to the tool by means of a clamping screw (not shown) extending through the bore 11.

Preferably, the upper relief flank 3a and associated collar portion 3c and the component rake surface 9 are curved such that when the insert is mounted in the cutter tool, the relief angle and the radial rake angle, when measured with respect to the tool, remain substantially constant along the length of the cutting edge 5. This form of construction of a milling cutting insert, particularly when associated with a cutting edge which slopes downwardly with respect to a base of the insert, is fully described in our prior U.S. Pat. Nos. 5,071,292 and 5,078,550.

Figure 5:
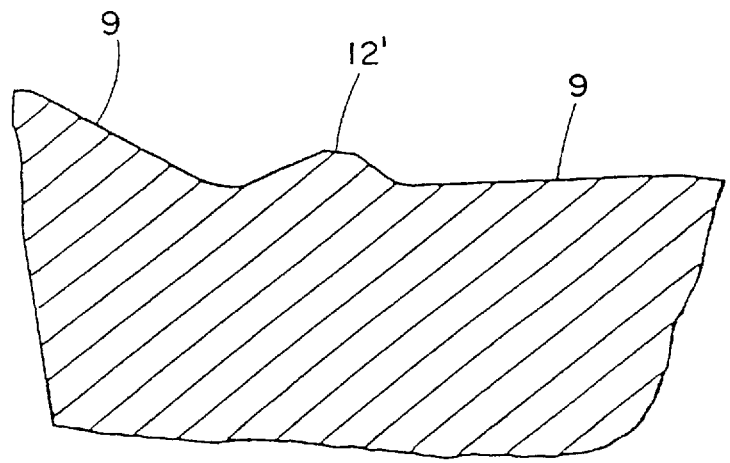
Figure 6:
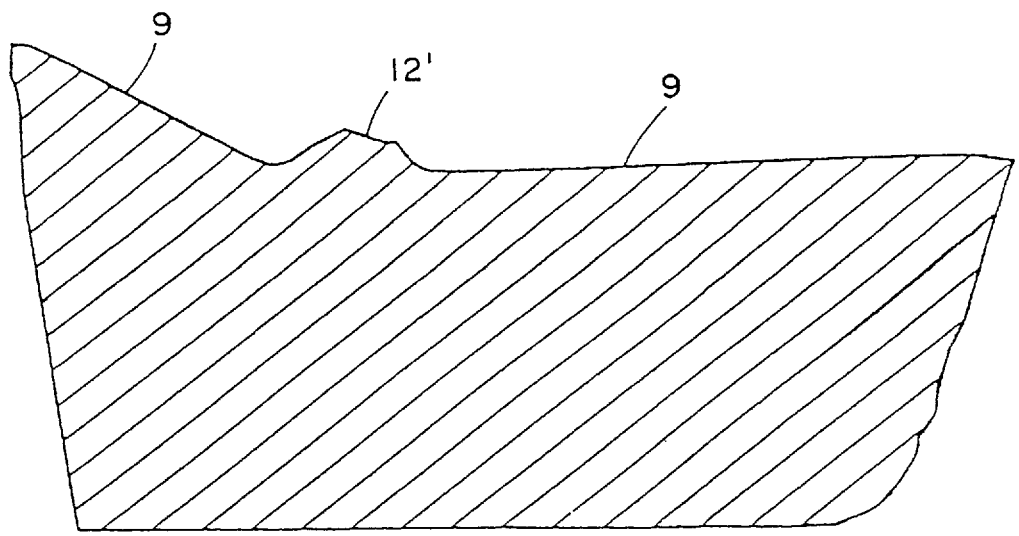

Formed and extending out of the upper rake surface 2 are four chip deflecting ribs 12 respectively associated with the four cutting edges 5. Each rib 12 extends from the central planar portion 10 towards the associated cutting edge so as to terminate in the region of the cutting edge 5a where the latter merges with its associated wiper edge 5b and, as clearly seen in FIG. 4, 5 and 6 of the drawings, so as to be spaced therefrom by the downwardly sloping component rake surface 9. The lateral extent of the rib's extremity adjacent the region of merger M is substantially coextensive with this region and does not extend significantly on either side of this region. Each rib 12 defines with the associated cutting edge 5a an angle $\mu$, where $\mu$ as shown in the drawings is acute. The angle $\mu 0$ can lie in the range 40°–110° (preferably 50°–90°). As can be seen in FIGS. 2, 5 and 6, of the drawings, rib 12 is formed with a top portion 12' which has its widest portion adjacent the central planar portion 10 and its narrowest portion adjacent the merger of the cutting edge 5a and the wiper edge 5b.

Figure 4:
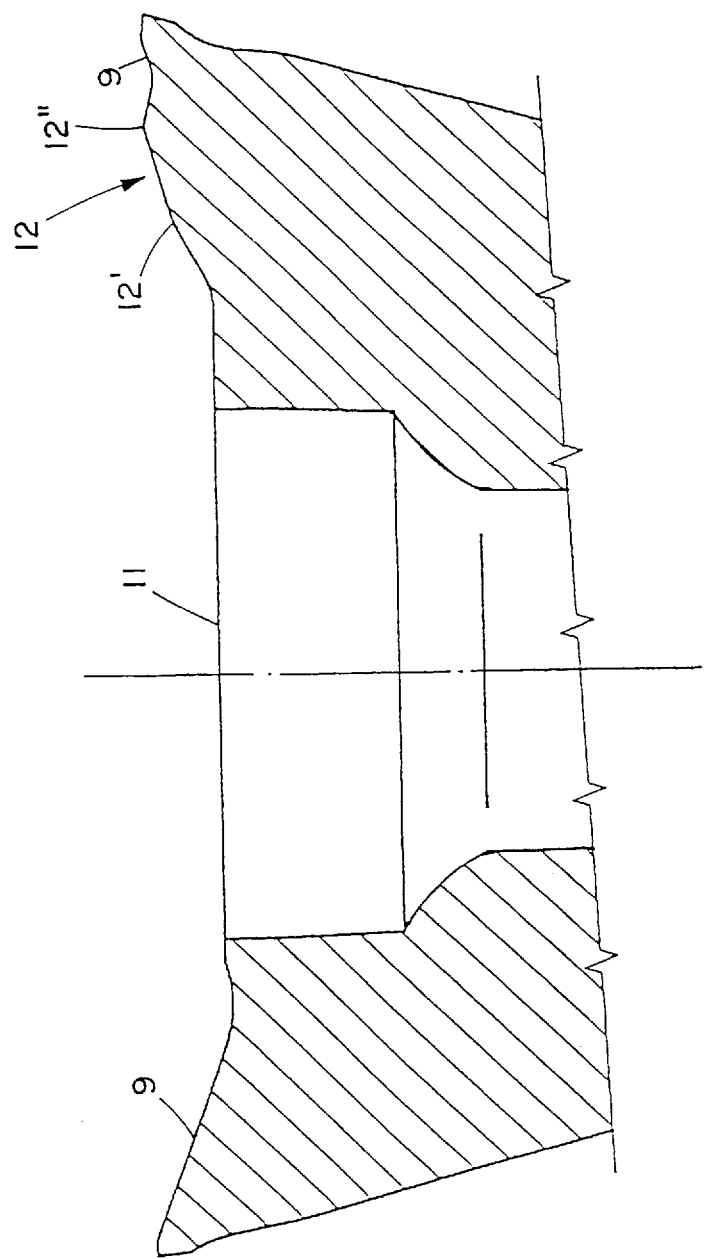
FIGS. 4, 5 and 6 are respective cross-sectional views of the insert shown in FIG. 2 taken along lines IV—IV, V—V and VI—VI.

As can clearly be seen in FIG. 4 of the drawings, each rib slopes upwardly from the central planar portion to an uppermost portion thereof 12" adjacent the region of merger M of the major and minor cutting edges. As seen in FIG. 4, the uppermost portion 12" of the rib is disposed at a level no lower, and even slightly higher, than the region of merger.

Figure 7:
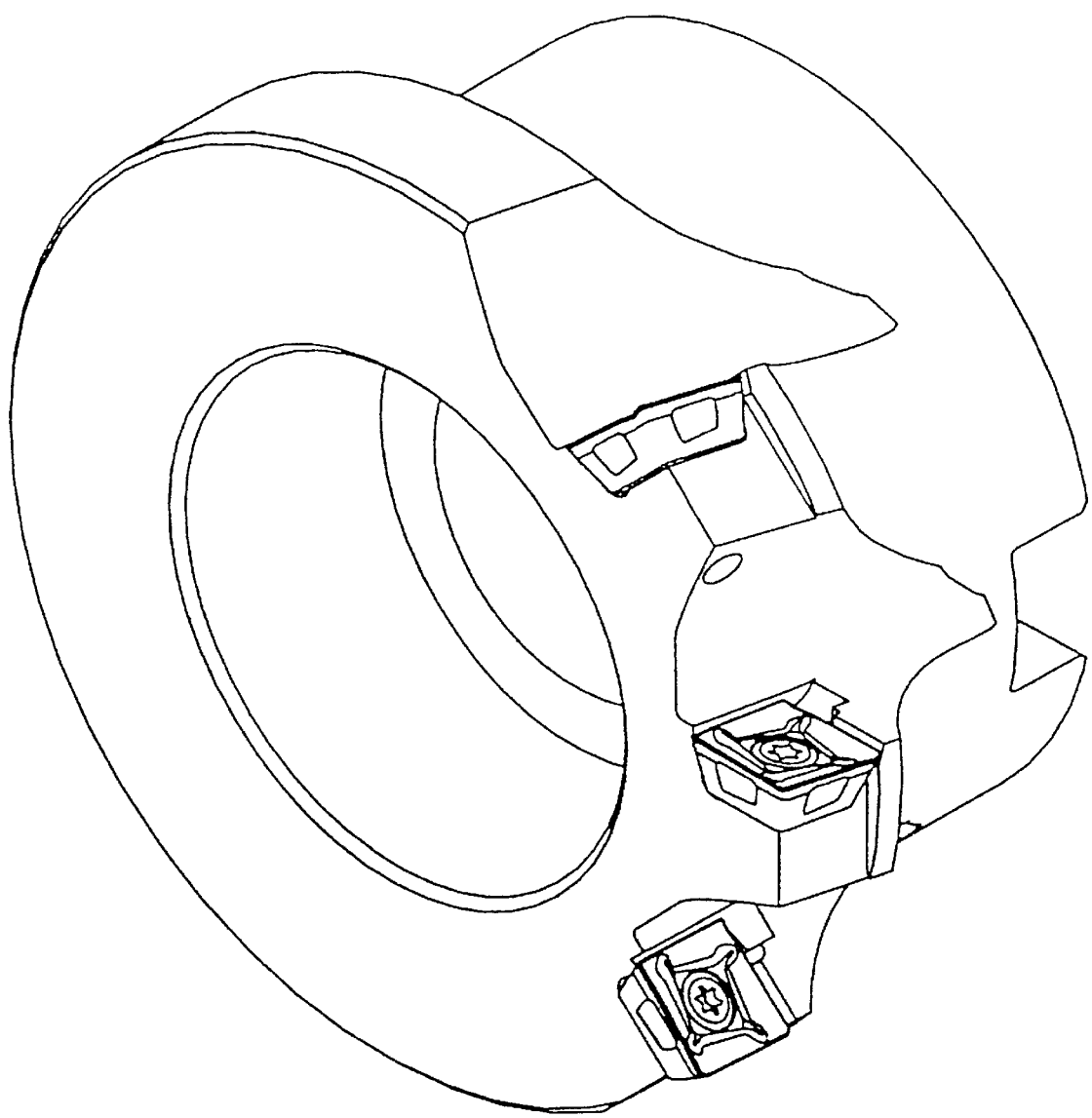
FIG. 7 shows the inserts as illustrated in the preceding drawings when mounted in a milling cutter.
Figure 8:
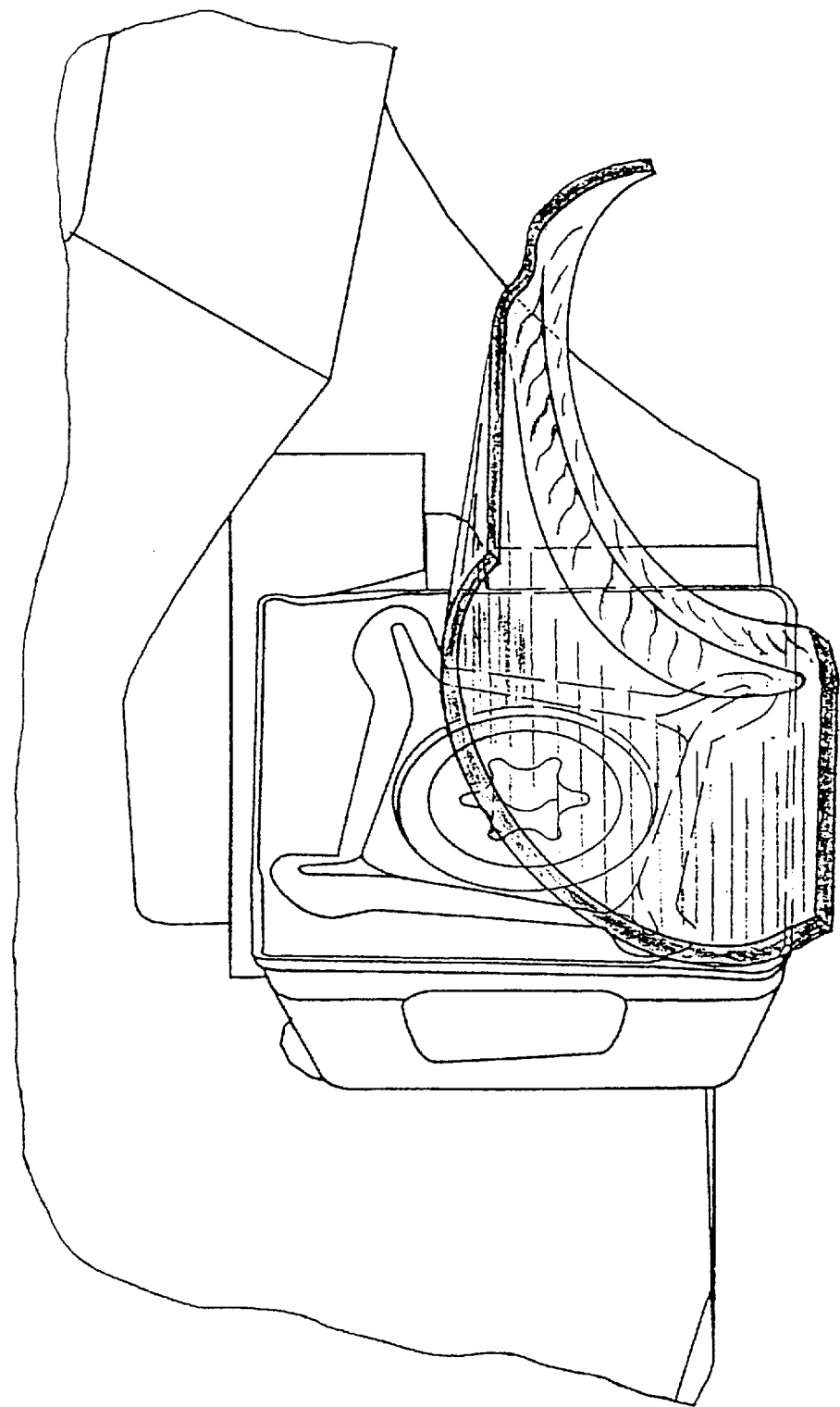
FIG. 8 is an enlarged view of a detail of the milling cutter and insert as shown in FIG. 7 illustrating the deflection of a chip.

As can be seen in FIGS. 7 and 8 of the drawings, when the insert just described is mounted in a milling cutting tool, for example, for the purpose of milling a shoulder having walls disposed at substantially 90° with respect to each other, milling is effected by the operationally indexed major cutting edge whilst the transversely directed wiper edge which forms a continuous extension of the adjacent cutter edge effects wiping. During this operation, the wiper edge constituting a continuous extension of the operationally indexed major cutting edge is spaced from the work piece and, as seen in FIG. 8 of the drawings, the chip which is cut is, in the region of the wiper edge, diverted therefrom by the associated chip diverting rib. In this way, it is ensured that the wiper edge constituting the continuous extension of the operationally indexed cutter edge is protected from damage by the chip which is generated during the cutting operation.

Whilst the invention has been specifically described with reference to a milling insert of substantially square shape, it will be realized that the provision of the chip diverting ribs can be used to protect cutting inserts designed for other functions and having other shapes.

We claim:

1. An exchangeable, indexable cutting insert of a substantially prismatic shape having an upper rake surface, an opposite, substantially parallel base surface and side surfaces with each pair of side surfaces intersecting at an insert corner, each side surface intersecting with said rake surface so as to define a cutting edge, each cutting edge comprising a major cutting edge portion extending from one insert corner and a succeeding minor cutting edge portion terminating in a successive insert corner, and chip diverting ribs respectively associated with said cutting edges and formed on said rake surface, each rib extending from an area adjacent a region of merger of said major and minor portions of the associated cutting edge such that a width of the rib is substantially co-extensive with said region.

2. An exchangeable, indexable cutting insert according to claim 1, wherein the angle defined between each rib and its associated major cutting edge portion is in the range of 40°–110°.

3. An exchangeable, indexable cutting insert according to claim 2, wherein said range is 50°–95°.

4. An exchangeable, indexable cutting insert according to claim 1, constituted by a milling insert of basic square shape having four alternative cutting edges, each cutting edge being formed continuously with a wiper edge of which it forms an extension and which is slightly angularly disposed with respect thereto, each cutting edge constituting said major cutting edge portion whilst the wiper edge which forms a continuous extension thereof constitutes the succeeding minor cutting edge portion.

5. An insert according to claim 1, wherein said minor cutting edge slopes from said major cutting edge towards the insert base surface.

6. An insert according to claim 1, wherein said rib is spaced from said region of merger by a portion of said rake surface.

7. An insert according to claim 1, wherein said rake surface slopes downwardly from its associated cutting edge portions.

8. An insert according to claim 1, wherein a width of a top portion of said rib varies in a direction towards a central portion of the insert.

9. An insert according to claim 1, wherein said rib slopes upwardly in a direction from a central portion of the insert towards an uppermost portion of the rib adjacent said region of merger.

10. An insert according to claim 1, wherein a top portion of the rib is not planar.

11. An insert according to claim 1, wherein:
   said rib is spaced from said region of merger by a portion of said rake surface; and
   said rib has a top portion, said top portion decreasing in width in a direction from a central portion of said insert towards said region of merger, and sloping upwardly in a direction from said central portion towards an uppermost portion of the rib adjacent said region of merger.

12. An indexable cutting insert of substantially prismatic shape having an upper rake surface, an opposite, substantially parallel base surface and side surfaces with each pair of side surfaces intersecting at an insert corner, each side surface intersecting with said rake surface so as to define a cutting edge;
   each cutting edge comprising a major cutting edge portion extending from one insert corner and a succeeding minor cutting edge portion terminating in a successive insert corner;

said rake surface of each cutting edge being formed with a chip diverting rib, said rib protruding above said upper rake surface and extending from an area adjacent a region of merger of said major and minor portions of an associated cutting edge towards a central portion of the insert, and a width of said rib is substantially co-extensive with said region.

13. An insert according to claim 12, wherein the angle defined between said rib and its associated major cutting edge portion is in the range of 40°–110°.

14. An insert according to claim 13, wherein said range is 50°–95°.

15. An insert according to claim 12, constituted by a milling insert of basic square shape having four alternative cutting edges, each cutting edge being formed continuously with a wiper edge of which it forms an extension and which slopes from the major cutting edge towards the insert base surface, each cutting edge constituting said major cutting edge portion whilst the wiper edge which forms a continuous extension thereof constitutes the succeeding minor cutting edge portion.

16. An insert according to claim 12, wherein said minor cutting edge slopes from said major cutting edge towards the insert base surface.

17. An insert according to claim 12, wherein said rib is spaced from said region of merger by a portion of said rake surface.

18. An insert according to claim 12, wherein said rake surface slopes downwardly from its associated cutting edge portions.

19. An insert according to claim 12, wherein a width of a top portion of said rib varies in a direction towards said central portion.

20. An insert according to claim 12, wherein said rib slopes upwardly in a direction from said central portion towards said uppermost portion, said uppermost portion being adjacent to said region of merger.

21. An insert according to claim 12, wherein a top portion of the rib is not planar.

22. An insert according to claim 12, wherein:

said rib is spaced from said region of merger by a portion of said rake surface; and said rib has a top portion, said top portion decreasing in width in a direction from said central portion towards said region of merger, and sloping upwardly in a direction from said central portion towards said uppermost portion, said uppermost portion being adjacent to said region of merger.

\* \* \* \* \*